Feb. 26, 1963  R. P. BOTHWELL  3,078,829
FLUID PRESSURE ACTUATED MOTOR
Filed April 13, 1960  4 Sheets-Sheet 1

Raymond P. Bothwell
INVENTOR.

BY *Clarence A. O'Brien*
*and Harvey B. Jacobson*
Attorneys

Feb. 26, 1963
R. P. BOTHWELL
3,078,829
FLUID PRESSURE ACTUATED MOTOR
Filed April 13, 1960
4 Sheets-Sheet 3
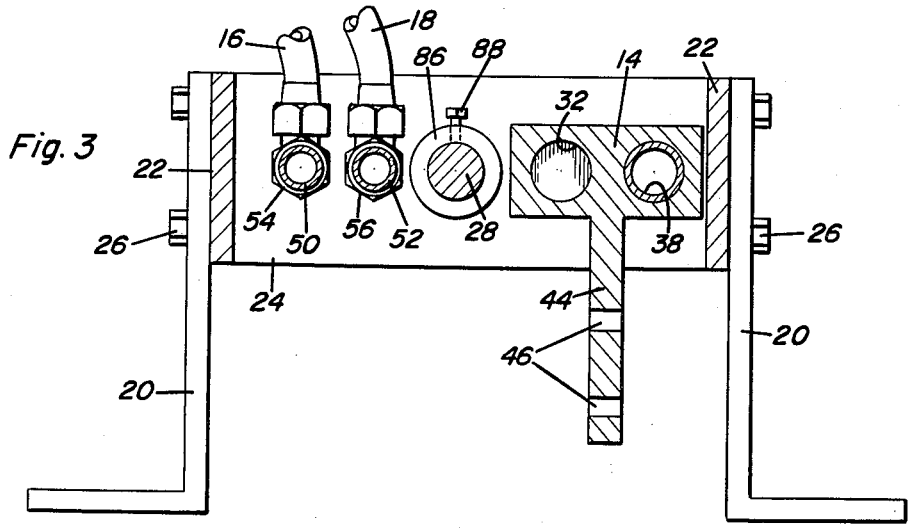
Fig. 3
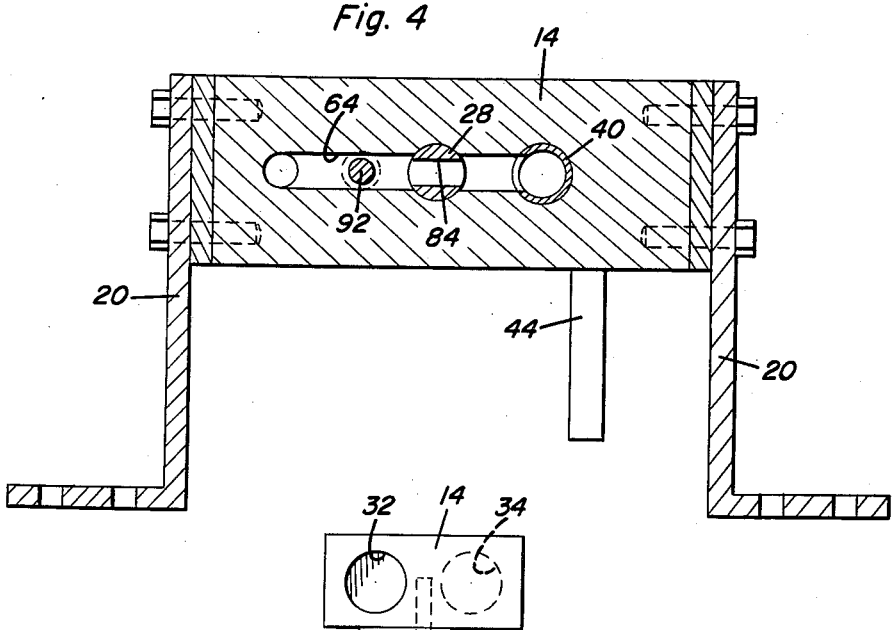
Fig. 4
Fig. 5
Raymond P. Bothwell
INVENTOR.

Feb. 26, 1963        R. P. BOTHWELL        3,078,829
FLUID PRESSURE ACTUATED MOTOR
Filed April 13, 1960        4 Sheets-Sheet 4
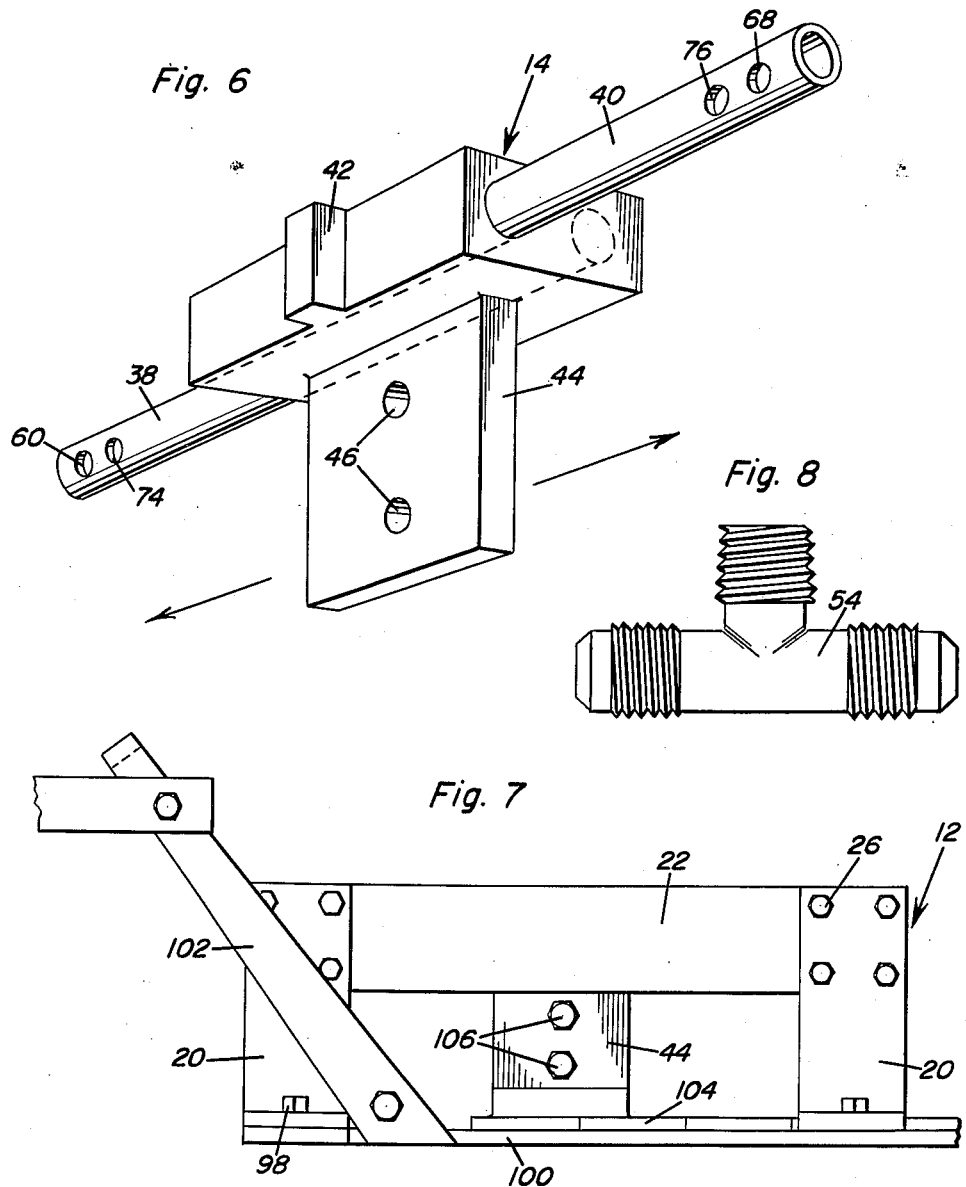
Raymond P. Bothwell
INVENTOR.
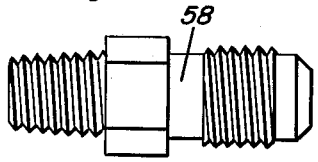

United States Patent Office 3,078,829
Patented Feb. 26, 1963

3,078,829
FLUID PRESSURE ACTUATED MOTOR
Raymond P. Bothwell, 5 Brogdon St., Sumter, S.C.
Filed Apr. 13, 1960, Ser. No. 22,046
3 Claims. (Cl. 121—50)

This invention comprises a novel and useful fluid pressure actuated motor and more particularly relates to a device having an improved means for converting the expansive force of fluids under pressure into reciprocatory motion of a driven member. Although the principles of the invention are embodied in a fluid pressure actuated motor, it will be understood that certain features of the invention are more broadly applicable to other classes of devices by which there is a conversion of power between a fluid under pressure and a reciprocating element, regardless of whether the energy converting means is an engine of various types, a motor, a metering or measuring device for the flow of fluids, or for other purposes.

The primary object of this invention is to provide a device for converting energy between an expansible fluid medium and a reciprocating free floating element and vice versa.

A further object of the invention is to provide a device which will be of simple and sturdy construction, having a minimum number of moving parts and wherein the disadvantages imposed upon the mechanism by inertia during reversal of the movement of the device shall be reduced to a minimum.

A further object of the invention is to provide a device in accordance with the preceding objects wherein the operating stroke of the fluid expansible chamber of the device and of the reciprocating member operatively connected thereto may be freed from the usual limitations as to length, speed and acceleration of the stroke.

Still another object of the invention is to provide a device in accordance with the preceding objects which shall include a free floating cylinder guidingly and slidingly supported from the frame upon a pair of oppositely positioned piston elements which are also utilized to supply a compressible fluid to and discharge the same from the cylinders of the device.

Yet another object of the invention is to provide a device in accordance with the preceding objects wherein there is obtained an improved means for distributing fluid to and from the cylinders of the device together with control means mounted in the supporting frame of the device in an improved and compact manner.

Still another object of the invention is to provide a device in accordance with the foregoing objects wherein there are provided improved means connecting the reciprocating element to the fluid conduit means for timing and controlling the flow of fluid through the device.

An additional object of the invention is to provide a device in accordance with the preceding objects which shall include means to adjust the operative connection between the fluid control means and the reciprocating element whereby to vary the stroke of the latter.

A still further object of the invention is to provide a device in accordance with the preceding objects which shall include means to vary the speeds of stroke of the reciprocating element in different directions.

An additional specific object of the invention is to provide a device wherein the driving or driven reciprocatory element of a motor or pump construction can be directly connected to the reciprocating actuator or driven member of an apparatus.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a vertical transverse sectional view taken substantially upon the plane indicated by the section line 3—3 of FIGURE 2;

FIGURE 4 is a further vertical transverse sectional view taken substantially upon the plane indicated by the section line 4—4 of FIGURE 2;

FIGURE 5 is an end view of the free floating reciprocating element comprising a body with cylindrical bores therein;

FIGURE 6 is a perspective view of the reciprocating element and its guiding and support means;

FIGURE 7 is an elevattional view, parts being broken away and omitted, and indicating the manner in which the energy transferring device of this invention may be connected to the reciprocating member comprising either an actuating or an actuated member for the apparatus; and FIGURES 8 and 9 are elevational views showing two types of fittings employed in connection with the fluid distribution system of the invention.

In the accompanying drawings there is disclosed a device adapted specifically to function as a fluid pressure actuated motor and to convert the energy of a pressurized fluid supplied to the device into reciprocatory motion of a free floating element which, in turn, is drivingly connected to some apparatus to be actuated by the motor. However, it is to be understood that the features of the invention can readily be applied to pumps by merely applying a reciprocatory driving force to the free floating element to, in turn, effect a pumping action in the cylinder chambers of the device.

Figure 1:
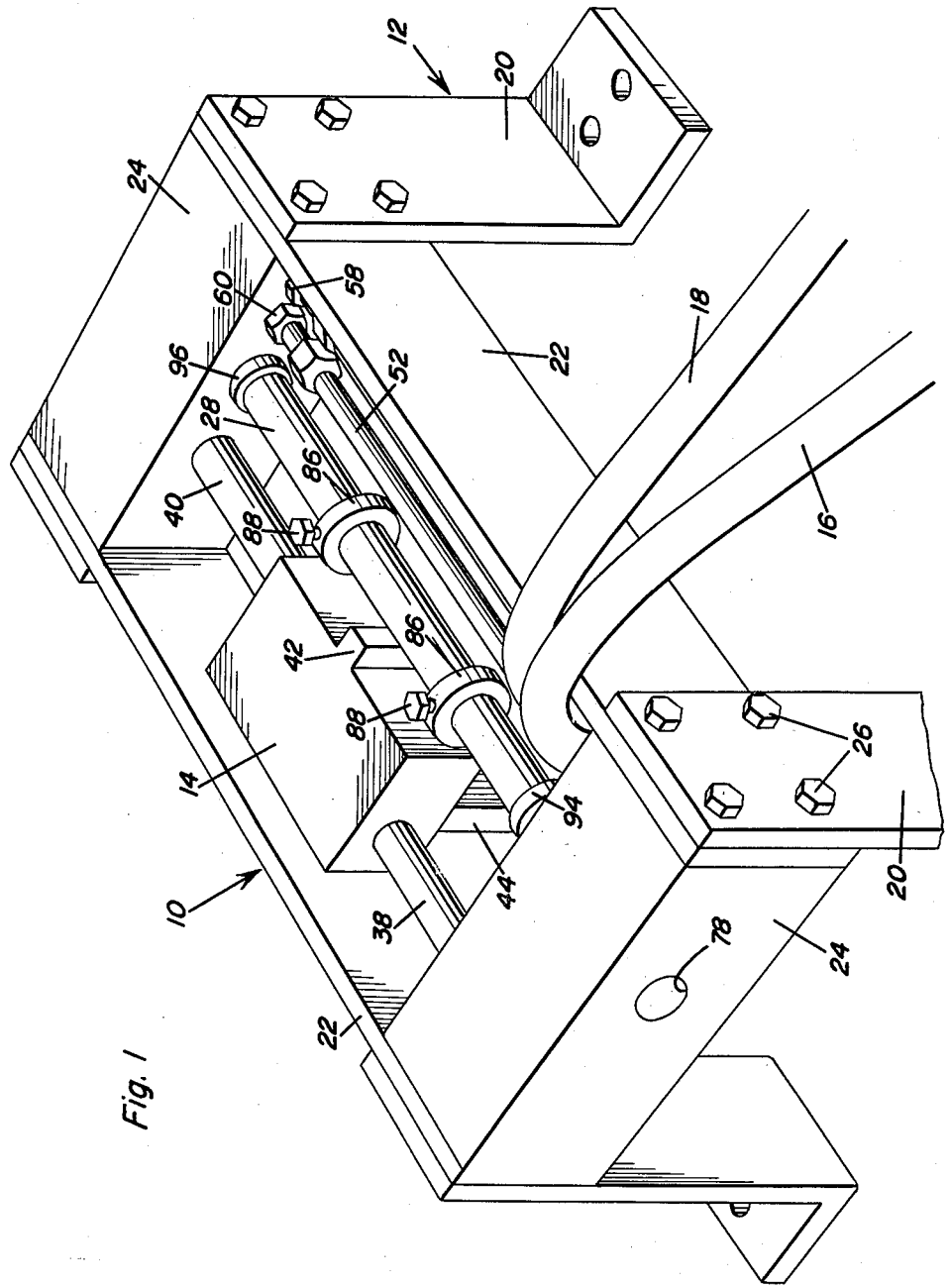
FIGURE 1 is a perspective view, parts being broken away, and showing a suitable embodiment of apparatus for carrying out the principles of this invention.

Referring first to FIGURE 1, it will be observed that the apparatus disclosed in this application for converting energy between an expansible fluid and a reciprocable element is designated generally by the numeral 10, the the same includnig a supporting frame 12 of any desired character upon which is supported and movably mounted a free floating element 14 which in this instance comprises a body having cylinders therein, and which element is to be reciprocated by the application of fluid pressure of any suitable source thereto, the fluid being circulated through the apparatus by means of a pair of flexible conduits 16 and 18.

In the arrangement illustrated, the supporting frame 12 consists of a plurality of brackets 20 which constitute supporting legs by means of which there are mounted a pair of side frame members 22, between the opposite ends of which are fixedly supported a pair of end blocks 24 the side frame members 22 and end blocks 24 being secured to the brackets or legs 20 by a plurality of fasteners such as the bolts 26.

A means for controlling and supplying an expansible fluid to the operating cylinders or chambers of the device is provided, connecting the conduits 16 and 18 thereto, and including a slide valve 28 whose ends are slidably and reciprocatingly journaled in the end blocks 24. Reciprocation of the slide valve 28 is effected by a connection between the free floating element 14 and the valve by means to be subsequently set forth which enables direct positive action of the valve by reciprocation of the element 14 and also enables a variation in the length of the reciprocating stroke of the element 14.

Figure 2:
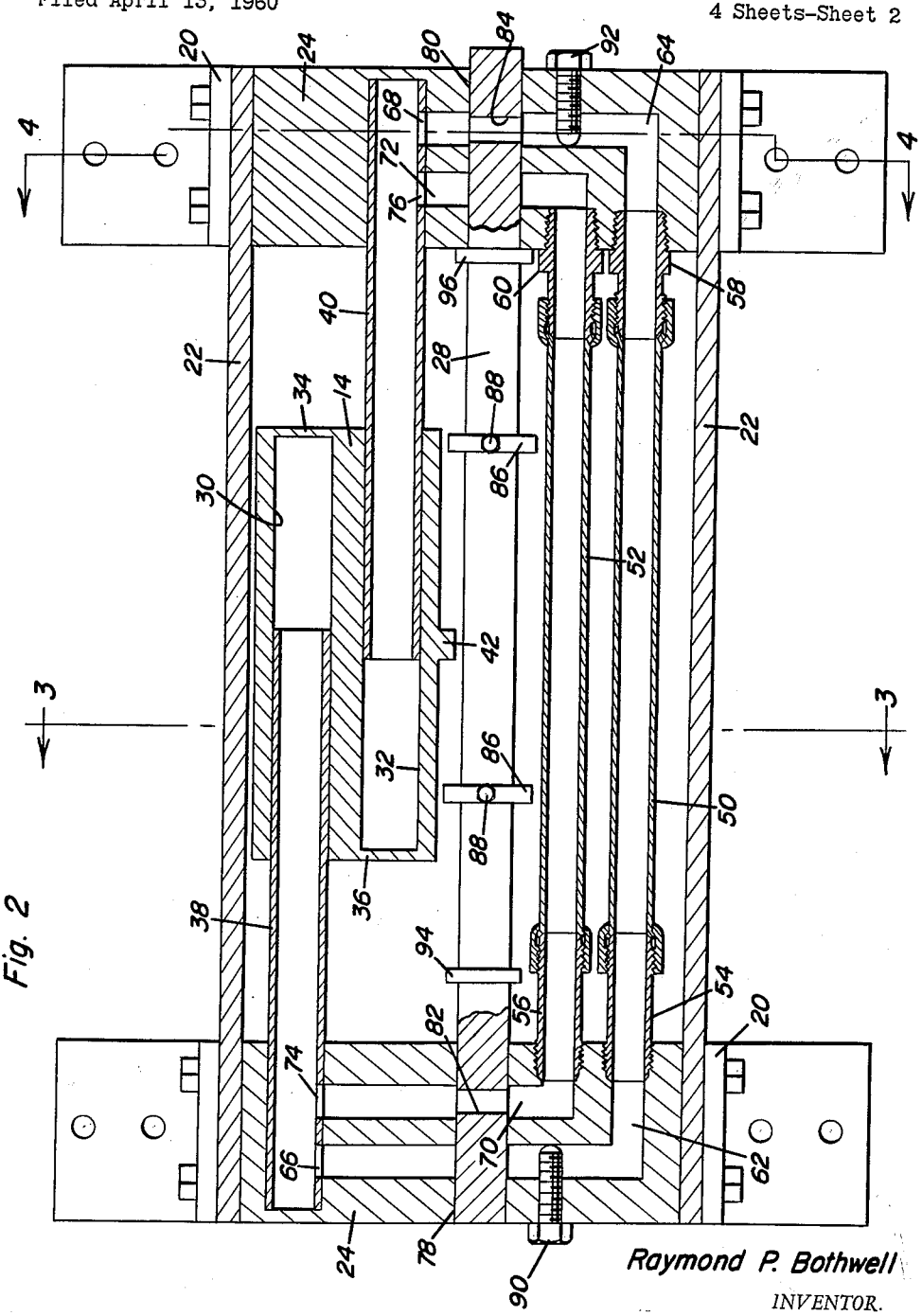
FIGURE 2 is a view in horizontal section through the device of FIGURE 1 and showing in particular the fluid passages and chambers of the device together with the fluid control means therefor.

Referring now particularly to FIGURE 2, it will be observed that the free floating element 14 comprises a body having a pair of cylindrical bores constituting working cylinders and which are designated by the numerals 30 and 32, these bores extending from the opposite ends of the body 14 and throughout substantially the entire length of the same, the bores having closures at one end as at 34 and 36 which comprises heads for the cylinders formed by the bores.

A pair of open ended tubes 38 and 40 are disposed in side by side relation with respect to each other and have their opposite ends carried by one of the end blocks 24. The open ended tubes 38 and 40 comprise a combined support and guide means for the reciprocating cylinders since the open ended tubes are received in the cylindrical bores 30 and 32 thereof, and also comprise a means for supplying pressure fluid to and exhausting the same from the working cylinders of the element 14. Actually therefore, the members 38 and 40 may also be considered to constitute the pistons of the engine which are stationary, with the element 14 comprising the reciprocating free moving cylinder of the engine.

As shown particularly in FIGURE 6, the free floating body 14 has a laterally projecting portion comprising a lug 42 extending from one side thereof intermediate its ends and which constitutes a part of a connecting means by which the free floating element is operatively connected to the slide valve 28. Depending from the underside of the element 14 is a lug or bracket 44 which may be apertured as at 46 and constitutes a means by which the reciprocating element 14 is operatively connected to an apparatus either to impart motion thereto or to receive motion therefrom in accordance with the use to which this device is to be put.

In the interest of simplicity, the reciprocating body 14 is of a unitary one-piece integral construction with the cylinder heads 34, 36, the lateral projection 42 and the depending lug 44 being integral therewith. It will be understood however, that any of these elements may be separately formed and detachably but rigidly secured to the element 14 for reciprocation therewith.

From a consideration of FIGURE 2 it will be observed that the end blocks are provided with a series of passages therein to be referred to in detail hereinafter, but which serve to effect flow of the fluid medium to and from the working chambers 30 and 32 of the element 14. Fluid is supplied to and exhausted from these passages by means of a fluid open ended inlet and outlet tubes 50 and 52, respectively, whose ends are received in T-shaped fittings 54 and 56 in one end block, and in other fittings 58 and 60 in the other end block. Through the T-shaped fittings communication is established between the tubes 50 and 52 and the source of fluid under pressure and a receiver for the fluid exhausted from the working chambers of the device, by means of the conduit 16 and 18 previously mentioned.

The opposite ends of the inlet tube 50 communicate with L-shaped passages 62 and 64 in the two end blocks, these passages in turn having communication with fluid inlet ports 66 and 68 in the stationarily mounted open ended tubes 38 and 40 comprising the support and guide means for the element 14. In a similar manner, the fluid outlet tube 52 has its ends communicating with the L-shaped passages 70 and 72 in the two end blocks which passages in turn communicate with the exhaust ports 74 and 76, respectively, in the tubes 38 and 40.

The two end blocks 24 are further provided with aligned transversely extending bores 78 and 80 in which the ends of the slide valve 28 are slidably disposed and retained. This slide valve in turn has a transverse bore 82 and 84 at the opposite ends thereof which bores are selectively placed in registration with the fluid inlet passages 62 and 64 and the ports 66 and 68 or with the fluid outlet passages 70 and 72 and the fluid outlet ports 74 and 76. Accordingly, when reciprocating movements are imparted to this slide valve it will selectively and in alternation, through the open ended support and guiding tubes 38 and 40 establish communication with the cylinder chambers or bores 30 and 32.

The operation of the slide valve 28 is effected by a connection with the free floating element 14. For that purpose, a pair of collars each indicated by the numeral 86 is slidably received upon the exterior surface of the rod-like sliding valve 28, being adjustably secured thereon as by setscrews 88. These collars are so disposed that they will receive therebetween the laterally projecting rib or lug 42 on the element 14 so that as the latter reciprocates this lug will strike one or the other of the collars and thus move the valve into one position or another. The transverse passages 82 and 84 are so disposed that when the passage 82 registers with the exhaust passage 70 as shown in FIGURE 2, the other passage or port 68 of the other member 40 will register with the inlet passage 64 as shown in FIGURE 2. It will thus be seen that one cylinder is exhausting while the other cylinder is being charged. When the member 14 travels to its other extreme, engagement of the laterally extending lug 42 with the other of the collars 86 will shift the valve to the other position and thus reverse the operation.

It will be observed that by adjustably varying the position of the collars 86 upon the valve 28, the length of stroke of the member 14 and in fact, the relative lengths of the strokes of the two cylinders 30 and 32 upon the stationary pistons 38 and 40 can be variably controlled.

It will be further noted from FIGURE 2 that there is provided a control means in the fluid inlet passages 62 and 64. Thus there is provided a screw 90 extending through the end block 24 and adjustably controlling flow through the inlet passage 62, while a similar screw 92 is provided in the other end block 24 to similarly control the inlet passage 64 in the end block. By properly adjusting these screws it is evident that the rate of flow of fluid through the inlet passages 62 and 64 can be varied or proportioned, thus controlling individually the rate of flow of the fluid to the two cylinders 30 and 32 and therefore, in turn, controlling the speed of travel of the element 14 in one direction or the other. The advantage of this arrangement is that a fast stroke in one direction accompanied by a slow return stroke in the other direction can be readily effected. Also, with a given or constant source of pressure and a constant maximum weight of flow of the fluid into the fluid inlet means 50, the speed of travel of the cylinder element 14 in either direction can be individually adjusted and controlled.

A pair of fixed stop rings as shown at 94 and 96 is carried by the sliding valve 28 to alternately abut against the end blocks 24 and thus limit and stop further travel of the sliding valve when the corresponding port or passage therethrough 82 or 84, is in registration with the intake or exhaust passages in the end blocks.

Reference is now made to FIGURE 7 which shows in fragmentary form a means whereby the fluid motor may be operatively connected to a piece of machinery, as for example to a sickle bar construction. As shown in this arrangement, the support frame 12 is secured as by bolts 98 to a base 100 which is connected as by suitable braces 102 with the framework, not shown, of a sickle type of cutter. The base 100 preferably includes a stationary cutter bar, not shown, but with which cooperates a movable cutter bar 104 which is secured to the lower end of the depending lug 44 as by means of fasteners 106 engaged through the bores 46 previously mentioned. In this arrangement, upon operation of the motor in the manner previously described, the reciprocating travel will be imparted to the movable sickle bar 104 with respect to stationary sickle bar, not shown, in order to effect the desired relative reciprocation of these elements. Obviously, other mechanisms may be connected to the depending lug 44 in either a driving or driven relation as previously set forth.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A device for converting fluid pressure into kinetic energy comprising a support frame, a free floating element, a pair of support means on said frame slidably and guidingly supporting the opposite ends of said element for reciprocation, separate fluid cylinders carried by said element slidably receiving said support means as pistons therein, means connected to said cylinders and a source of fluid pressure for controlling the flow of fluid into and out of said cylinders, actuating means connected between the control means and floating element, said actuating means automatically operating the control means in timed relation to movements of said floating element so as to cause said floating element to be continuously reciprocated by fluid pressure from said source, said element comprising a body having separate parallel bores extending thereinto from opposite ends to constitute said cylinders, said frame including a pair of opposed end blocks upon which said support means are mounted, said support means comprising a pair of open ended tubes each secured to an end block and being slidably received in one of said separate cylinders, said fluid control means including a fluid inlet and a fluid outlet tube each having its ends secured to said end blocks, passages in each end block connecting the ends of said inlet and outlet tubes to said open ended tubes, a flow control rod having spaced ends slidable in said blocks regulating flow of fluid between said inlet and outlet tubes and said open-ended tubes, said rod including a transverse passage in each end selectively establishing communication between one of said open ended tubes and said end block passages.

2. A device as defined in claim 1 wherein the passages in said blocks connected to the inlet tube each contain an adjustable device for adjustably restricting same.

3. A device as defined in claim 1 wherein said inlet tube is connected to a pressure supply conduit and said outlet tube is connected to an exhaust conduit.

References Cited in the file of this patent
UNITED STATES PATENTS

| | | |
|---|---|---|
| 734,816 | Castelnau | July 28, 1903 |
| 848,330 | Venney | Mar. 26, 1907 |
| 877,635 | Dietz | Jan. 28, 1908 |
| 966,059 | Sears | Aug. 2, 1910 |
| 1,036,895 | Parsons | Aug. 27, 1912 |
| 1,343,612 | Born | June 15, 1920 |
| 2,688,825 | Montanus | Sept. 15, 1954 |
| 2,915,042 | Shafer | Dec. 1, 1959 |
| 2,921,561 | Sendoykas | Jan. 19, 1960 |
| 2,943,604 | Chubb | July 5, 1960 |
| 2,966,889 | Thumim | Jan. 3, 1961 |
| 2,984,981 | Rowles et al. | May 23, 1961 |

FOREIGN PATENTS

| | | |
|---|---|---|
| 1,193 | Great Britain | 1868 |